(12) United States Patent
Hulyalkar et al.

(10) Patent No.: US 8,704,932 B2
(45) Date of Patent: Apr. 22, 2014

(54) METHOD AND SYSTEM FOR NOISE REDUCTION FOR 3D VIDEO CONTENT

(75) Inventors: Samir Hulyalkar, Newton, PA (US); Xuemin Chen, Rancho Santa Fe, CA (US); Marcus Kellerman, San Diego, CA (US); Ilya Klebanov, Thornhill, CA (US)

(73) Assignee: Broadcom Corporation, Irvine, CA (US)

( * ) Notice: Subject to any disclaimer, the term of this patent is extended or adjusted under 35 U.S.C. 154(b) by 621 days.

(21) Appl. No.: 12/604,936

(22) Filed: Oct. 23, 2009

(65) Prior Publication Data
US 2011/0096151 A1 Apr. 28, 2011

(51) Int. Cl.
*H04N 5/225* (2006.01)

(52) U.S. Cl.
USPC ...... 348/335; 348/51; 348/576; 348/E13.075; 345/8; 345/427; 345/629; 345/630; 345/632; 382/284

(58) Field of Classification Search
USPC .......................... 348/51, 576; 382/284; 345/8
See application file for complete search history.

(56) References Cited

U.S. PATENT DOCUMENTS

| 6,873,341 B1* | 3/2005 | Adams et al. ........... 345/629 |
| 7,907,793 B1* | 3/2011 | Sandrew ................ 382/284 |
| 2007/0002159 A1* | 1/2007 | Olsen et al. ........... 348/335 |
| 2010/0007582 A1* | 1/2010 | Zalewski ............... 345/8 |

* cited by examiner

*Primary Examiner* — Kyung H Shin
(74) *Attorney, Agent, or Firm* — Foley & Lardner LLP

(57) ABSTRACT

A video processing system receives left and right 3D video and/or graphics frames and generates noise reduced left 3D video, right 3D video and/or graphics frames based on parallax compensated left and right frames. Displacement of imagery and/or pixel structures is determined relative to opposite side left and/or right frames. Parallax vectors are determined for parallax compensated left 3D video, right 3D video and/or graphics frames. A search area for displacement may be bounded by parallax limitations. Left 3D frames may be blended with the parallax compensated right 3D frames. Right 3D frames may be blended with the parallax compensated left 3D frames. The left 3D video, right 3D video and/or graphics frames comprise images that are captured, representative of and/or are displayed at a same time instant or at different time instants. Motion estimation, motion adaptation and/or motion compensation techniques may be utilized with parallax techniques.

22 Claims, 5 Drawing Sheets

METHOD AND SYSTEM FOR NOISE REDUCTION FOR 3D VIDEO CONTENT

CROSS-REFERENCE TO RELATED APPLICATIONS/INCORPORATION BY REFERENCE

This application makes reference to:
U.S. Patent Application Ser. No. 61/287,624 which was filed on Dec. 17, 2009;
U.S. Patent Application Ser. No. 61/287,634 which was filed on Dec. 17, 2009;
U.S. patent application Ser. No. 12/554,416 which was filed on Sep. 4, 2009;
U.S. patent application Ser. No. 12/546,644 which was filed on Aug. 24, 2009;
U.S. patent application Ser. No. 12/619,461 which was filed on Nov. 16, 2009;
U.S. patent application Ser. No. 12/578,048 which was filed on Oct. 13, 2009;
U.S. Patent Application Ser. No. 61/287,653 which was filed on Dec. 17, 2009;
U.S. Patent Application Ser. No. 61/242,644 which was filed on Sep. 15, 2009;
U.S. patent application Ser. No. 12/604,980 which was filed on Oct. 23, 2009;
U.S. patent application Ser. No. 12/545,679 which was filed on Aug. 21, 2009;
U.S. patent application Ser. No. 12/560,554 which was filed on Sep. 16, 2009;
U.S. patent application Ser. No. 12/560,578 which was filed on Sep. 16, 2009;
U.S. patent application Ser. No. 12/560,592 which was filed on Sep. 16, 2009;
U.S. Patent Application Ser. No. 61/287,668 which was filed on Dec. 17, 2009;
U.S. patent application Ser. No. 12/573,746 which was filed on Oct. 5, 2009;
U.S. patent application Ser. No. 12/573,771 which was filed on Oct. 5, 2009;
U.S. Patent Application Ser. No. 61/287,673 which was filed on Dec. 17, 2009;
U.S. Patent Application Ser. No. 61/287,682 which was filed on Dec. 17, 2009;
U.S. patent application Ser. No. 12/605,039 which was filed on Oct. 23, 2009;
U.S. Patent Application Ser. No. 61/287,689 which was filed on Dec. 17, 2009;
U.S. Patent Application Ser. No. 61/287,692 which was filed on Dec. 17, 2009.

Each of the above stated applications is hereby incorporated herein by reference in its entirety.

FIELD OF THE INVENTION

Certain embodiments of the invention relate to video processing. More specifically, certain embodiments of the invention relate to a method and system for noise reduction for 3D video content.

BACKGROUND OF THE INVENTION

In digital video and/or graphics processing, noise may occur that may generate incorrect pixels. This noise may distort a video image and may interfere with viewing of the image content. Noise may also create issues with regard to processing of video data. In some cases, random noise may be introduced during transmission of the video data from one device to another. White noise may be generally characterized as a Gaussian distribution in spatial and/or temporal domains, other types of analog noises in the video signals may not be easily estimated. In various instances, noise may comprise an artifact of image processing, for example, an artifact of image compression. For example, MPEG compression may be lossy and, in some instances, it may distort the video content. In this regard, the more the video is compressed, that is, the higher the compression ratio, the less the reconstructed video resembles the original information. Some examples of MPEG video distortion are a loss of texture, detail, and/or edges. MPEG compression may also result in ringing on sharper edges and/or discontinuities on block edges. Because MPEG compression techniques are based on defining blocks of video image samples for processing, MPEG compression may also result in visible "macroblocking" that may result due to bit errors. In MPEG, a macroblock is the area covered by a 16×16 array of luma samples in a video image. Luma may refer to a component of the video image that represents brightness. Moreover, noise due to quantization operations, as well as aliasing and/or temporal effects may all result from the use of MPEG compression operations.

When MPEG video compression results in loss of detail in the video image it is said to "blur" the video image. When MPEG video compression results in added distortion on the video image it is said to produce "artifacts" on the video image. For example, the term "mosquito noise" may refer to MPEG artifacts that may be caused by the quantization of high spatial frequency components in the image. Mosquito noise may also be referred to as "ringing" or "Gibb's effect."

Some of the characteristics of mosquito noise may comprise artifacts of 8×8 block Discrete Cosine Transform (DCT) operations in MPEG compression. While generally confined to a particular 8×8 block of video samples, in some instances, motion compensation may result in mosquito noise beyond the block boundary. Mosquito noise commonly appears near luma edges, making credits, text, and/or cartoons particularly susceptible to this form of artifact. Mosquito noise may be more common, and generally more severe, at low bit rates. For example, mosquito noise may be more severe when macroblocks are coded with a higher quantization scale and/or on a larger quantization matrix.

Mosquito noise may tend to appear as very high spatial frequencies within the processing block. In some instances, when the input video to the MPEG compression operation has any motion, the mosquito noise generated may tend to vary rapidly and/or randomly resulting in flickering noise. Flickering noise may be particularly objectionable to a viewer of the decompressed video image. In other instances, when the input video to the MPEG compression operation is constant, the mosquito noise that results is generally constant as well. Horizontal edges tend to generate horizontal ringing while vertical edges tend to generate vertical ringing. While mosquito noise may also occur in the color components or chroma of a video image, it may generally be less of a problem since it is less objectionable to a viewer of the decompressed video image.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for noise reduction for 3D video content, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
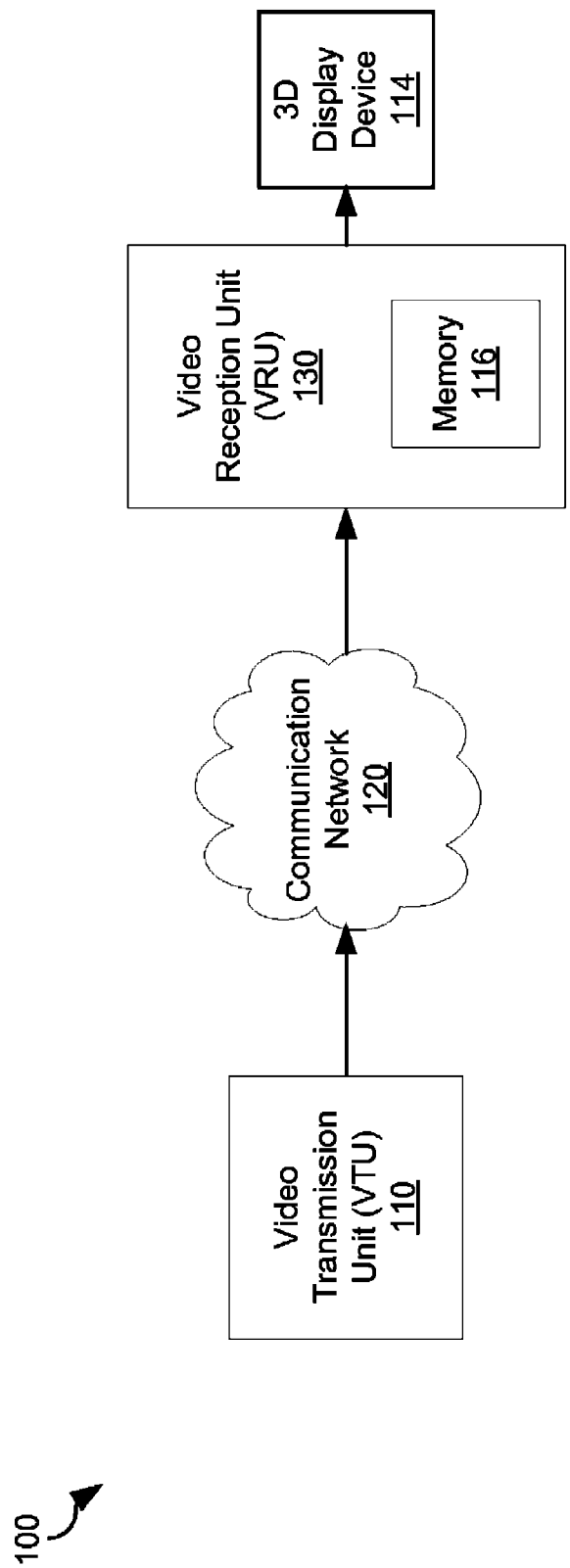
FIG. 1 is a block diagram of an exemplary 3D video and/or 3D graphics communication system, in accordance with an embodiment of the invention.

Certain embodiments of the invention can be found in a method and system for noise reduction for 3D video content. In various embodiments of the invention, a video processing system may be operable to receive left and right 3D video and/or graphics frames and generate noise reduced left 3D video, right 3D video and/or graphics frames utilizing parallax compensation of the left 3D video and right 3D video and/or graphics frames. Displacement of imagery and/or pixel structures, relative to the left 3D video and the right 3D video and/or the graphics frames may be determined. Redundant and/or correlated imagery and/or pixel structures in the left 3D video, the right 3D video and/or the graphics frames may be searched for within a bounded search area of a corresponding opposite side of the left 3D video, the right 3D video and/or the graphics frame. In various embodiments of the invention, the bounded search area may be based on a limitation of displacement that may be due to parallax of the redundant and/or correlated imagery and/or pixel structure in the left 3D video and the right 3D video and/or the graphics frames. Parallax vectors may be determined based on image and/or pixel structure displacement in the left 3D video and/or the graphics frames and/or the right 3D video and/or the graphics frames. The parallax compensated left 3D video and the right 3D video and/or the graphics frames may be determined based on the parallax vectors. The left 3D video and/or the graphics frames may be blended with the parallax compensated right 3D video and/or the graphics frames. Similarly, the right 3D video and/or the graphics frames may be blended with the parallax compensated left 3D video and/or the graphics frames. The left 3D video, the right 3D video and/or the graphics frames may comprise images that are captured, representative of and/or are displayed concurrently in time. In this manner, noise may be reduced in the left and/or right 3D video and/or the graphics frames without introducing delays caused by processing sequential frames.

Alternatively, the left 3D video, the right 3D video and/or the graphics frames may comprise images that are captured, representative of and/or are displayed at different time instants. Accordingly, future and/or past, left and/or right 3D video and/or graphics frames may be utilized in parallax estimation and/or parallax compensation of current left and/or right 3D video and/or graphics frames. In this regard, motion estimation, bandlet and/or other suitable techniques may be utilized as well. Furthermore, motion-adaptive and/or motion-compensated noise reduction on the left and/or right 3D video and/or graphics frames may be utilized with parallax estimation and/or parallax compensation. Combining parallax compensation and motion compensation techniques may improve noise reduction. In instances when future and/or past frames are utilized for improving parallax estimation and/or compensation, for example, when motion estimation and/or compensation are utilized, complexity and time delay may increase.

FIG. 1 is a block diagram of an exemplary 3D video and/or 3D graphics communication system, in accordance with an embodiment of the invention. Referring to FIG. 1, there is shown a video transmission unit (VTU) 110, a communication network 120, a video reception unit (VRU) 130, a memory 116 and a 3D display device 114.

The VTU 110 may comprise suitable logic, circuitry, interfaces and/or code that may be operable to provide coded video content to the VRU 130. The VTU 110 may be operable to encode 3D video. For example, the VTU 110 may be operable to encode the 3D video as a left view 3D video stream and a right view 3D video stream. The left view 3D video stream and/or the right view 3D video stream may be transmitted via different channels to the VRU 130. In addition, one or more graphics information streams may be transmitted via different channels to the VRU 130, for example, 2D or left and right view 3D graphics information streams. Examples of the VTU 110 may comprise a cable television head-end, a direct broadcast satellite head-end and a web server. Left view and right view 3D video and/or graphics streams and frames may be referred to as left and right 3D video and/or graphics streams and frames, respectively, left and right video and/or graphics streams or frames, respectively or simply left and right streams or frames, respectively.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may comprise a local area network, a wide area network, and the Internet.

The VRU 130 may comprise suitable logic, circuitry, interfaces and/or code that may be operable to receive a transport stream from the VTU 110 over the communication network 120. The received transport stream may comprise coded left and/or right 3D video streams, for example, video streams comprising one or more 3D TV programs and/or may comprise graphics information streams, for example. In this regard, the VRU 130 may be operable to de-multiplex or parse the left and/or right 3D video streams and/or the graphics information streams from the received transport stream. The VRU 130 may extract and/or may store in the memory 116 of the VRU 130, the left and/or right 3D video stream data and/or the graphics information. The VRU 130 may be operable to decode the extracted left and/or right 3D video stream data. In various embodiments of the invention, the graphics information may not be received from the VTU 100. For example, the graphics information may be stored in the VRU 130. The graphics information may comprise 2D content and/or may comprise left and right view 3D graphics content. The graphics information may correspond to the left and/or right view 3D video content or may be independent of the video content.

The graphics information may be selected based on user input. The VRU 130 may be operable to generate graphics frames, for example, 2D and/or left and/or right 3D graphics frames, based on the received or stored graphics information. The received and/or stored graphics information may comprise graphics primitives that may be rendered by the VRU 130 to generate the graphics frames. Furthermore, the VRU 130 may comprise suitable logic, circuitry, interfaces and/or code that may be operable to detect and/or reduce noise in the decoded left and/or right 3D video frames and/or left and/or right graphics frames. An exemplary VRU 130 may comprise a set-top box and/or a personal computer.

The 3D display device 114 may be operable to display the left and/or right view 3D video and/or graphics streams. In various embodiments of the invention, the 3D display device 114 may be operable to blend a left and/or right view video frame with graphics data. The 3D display device 114 may be operable to display the left and/or right view 3D video and/or graphics frames based on time sequential display and/or patterns of polarized left and right pixels, for example. An exemplary 3D display device 114 may comprise a 3D television or a computer monitor.

In operation, the VTU 110 may be operable to encode left and/or right view 3D video and/or graphics information, for example, 3D graphics information. In this regard, a 3D TV program may be encoded into a left view 3D video stream and/or a right view 3D video stream. Similarly, graphics information may be encoded into one or more streams, for example, a 2D graphics stream and/or a left 3D graphics information stream and/or a right 3D graphics information stream. A multiplexed transport stream comprising a plurality of encoded 3D video and/or graphics streams may be communicated to the VRU 130 over the communication network 120. The VRU 130 may be operable to receive and/or demultiplex the transport stream and may be operable to extract the left and/or right 3D video stream and/or the graphics information. The VRU 130 may be operable to decode the received left and/or right 3D video streams and the received graphics information streams and may generate left and/or right 3D video frames and/or graphics frames.

In various embodiments of the invention, the VRU 130 may be operable to detect and/or reduce noise in the decoded left and/or right 3D video frames and/or in the graphics frames that may comprise left and/or right 3D graphics frames. In this regard, corresponding left and/or right view 3D video and/or left and/or right view 3D graphics frames may comprise redundant pixels structures in different locations within corresponding left and/or right view 3D video and/or graphics frames. For example, a parallax effect may cause an object located in one position of a left frame to be displaced to a different location in a corresponding right frame. The parallax effect may result from different points of view or different lines of sight from a left eye or left camera lens to the object and a right eye or right camera lens to the object. The VRU 130 may be operable to detect displacement of imagery and/or pixel structures, for example, due to parallax effects in the corresponding left and/or right view 3D video and/or graphics frames.

The VRU 130 may be operable to provide compensation for the displacement of imagery and/or pixel structures due to parallax, for example, when performing noise reduction. For example, a parallax compensated left view 3D video and/or graphics frame may be blended with a corresponding right view 3D video and/or graphics frame to reduce and/or filter noise. In various embodiments of the invention, both parallax compensated noise reduction and motion compensated noise reduction involving frames captured in a sequence over time, may be utilized for left and/or right view 3D video and/or graphics frames, however, the motion compensated noise reduction may introduce delay into the noise reduction process. Parallax compensated noise reduction may performed without a delay that may introduced by utilizing multiple time sequential frames for noise reduction, for example, in IIR filtering.

Figure 2:
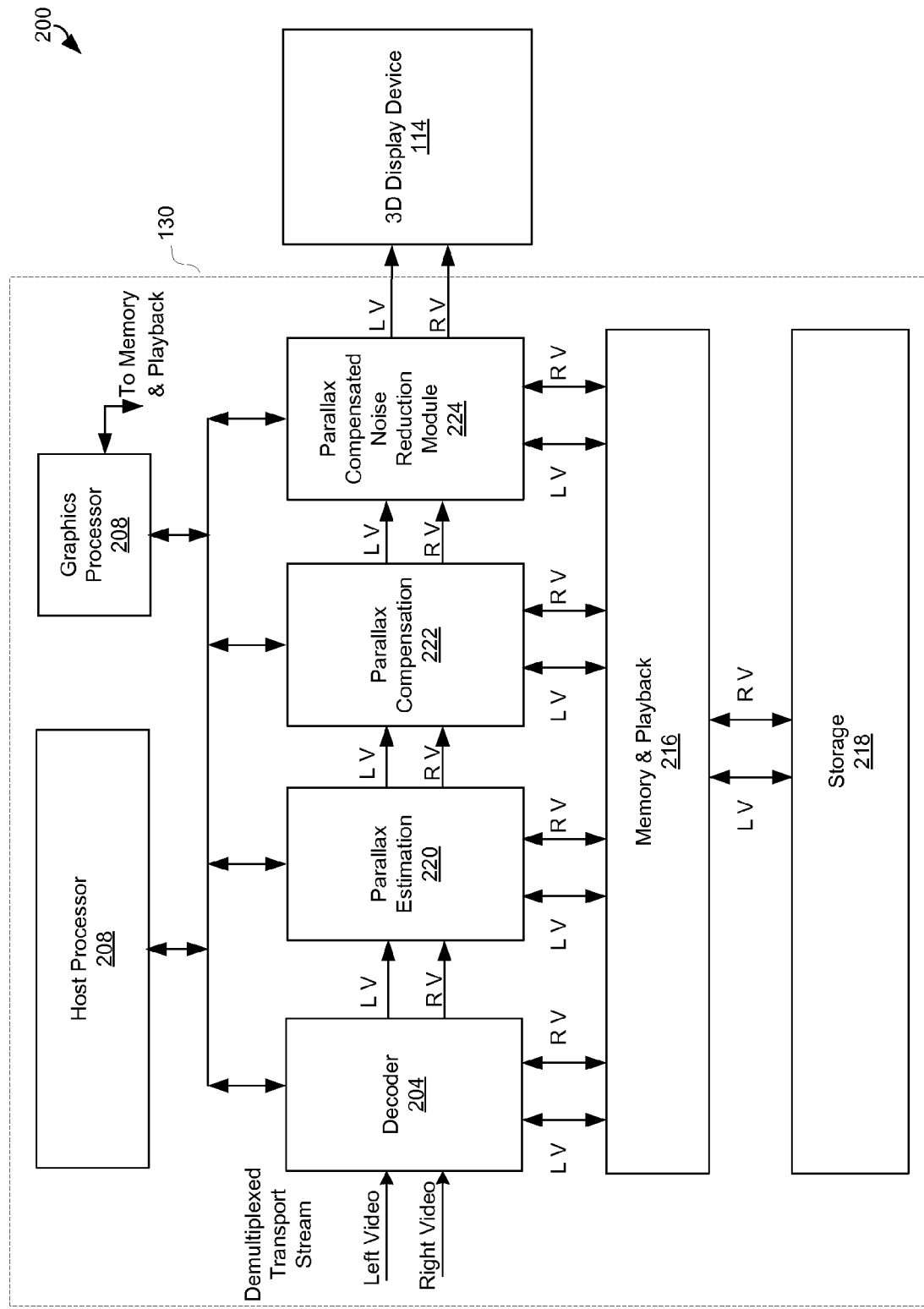
FIG. 2 is a block diagram that illustrates an exemplary video reception unit that may be operable to detect and reduce noise in left and/or right view 3D video and/or graphics frames based on parallax compensation, in accordance with an embodiment of the invention.

FIG. 2 is a block diagram that illustrates an exemplary video reception unit that may be operable to detect and reduce noise in left and/or right view 3D video and/or graphics frames based on parallax compensation, in accordance with an embodiment of the invention. Referring to FIG. 2, there is shown a video processing system 200 comprising the VRU 130 that may comprise a host processor 208, a decoder 204, graphics processor 210, a memory and playback module 216, a local storage 218, a parallax estimation module 220, a parallax compensation module 222 and a parallax compensated noise reduction module 224. In addition, there is shown the 3D display device 114.

Exemplary aspects of the VRU 130 and the 3D display device 114 are described with respect to FIG. 1.

The host processor 208 may comprise suitable logic, circuitry, interfaces and/or code that may be operable to control operations of various units within the VRU 130, for example, the decoder 204, the graphics processor 210, the memory and playback module 216, the local storage 218, the parallax estimation module 220, the parallax compensation module 222 and the parallax compensated noise reduction module 224. The host processor 208 may support various applications, for example, 3D video streaming on the VRU 130. The host processor 208 may be operable to communicate with the memory and playback 216 and/or the local storage 218. The host processor 208 may be operable to generate left and/or right graphics information for graphics that may overlay, be blended with and/or replace the received left and/or right 3D video and/or graphics frames, for example. Exemplary graphics may comprise a ticker, overlaid information, a user interface, for example, a user guide and/or a menu or may comprise 3D graphics to overlay 3D video data. The left and/or right graphics information may be communicated to the graphics processor 210 for generating left and/or right 3D graphics frames which may be referred to as left and right graphics streams or for generating or 2D graphics frames, for example. In an exemplary embodiment of the invention, the host processor 208 may be configured to select graphics for display in the 3D TV program.

The decoder 204 may comprise suitable logic, circuitry, interfaces and/or code that may be operable to decode received left view video from the VTU 110 on a frame by frame basis. The decoder 204 may be operable to utilize various video decompression algorithms such as specified in MPEG-2, MPEG-4, AVC, VC1, VP6, H.264 and/or other video formats to form decompressed or decoded video content for the received left view video from the VTU 110. Information such as the scene information from left view decoding may be communicated to be used for right view decoding, for example. In addition, the decoder 204 may be operable to decode right view video from the VTU 110 frame by frame. The decoder 204 may be operable to utilize various video decompression algorithms such as specified in MPEG-2, MPEG-4, AVC, VC1, VP6, H.264 and/or other video formats to form decompressed or decoded video content for the received right view video from the VTU 110.

The graphics processor 210 may comprise suitable logic, circuitry, interfaces and/or code that may be operable to receive 2D or 3D graphics information, for example left and/or right 3D graphics information from the host processor 208 and/or the memory and playback module 216, for example, and may perform graphics processing. The graphics processor 210 may be operable to generate corresponding 2D or 3D graphics frames, for example, for 3D left and right view graphics streams. The generated graphics frames may be communicated to the 3D display device 114.

The memory and playback module 216 may comprise suitable logic, circuitry, interfaces and/or code that may be operable to store information such as executable instructions, parameters and data that may be utilized by the VRU 130. The executable instructions may comprise various image processing algorithms that may be utilized to process the left and/or right video content by the decoder 204. Furthermore, the executable instruction may comprise steps for performing parallax estimation, parallax compensation and/or parallax compensated noise reduction. In various embodiments of the invention, the executable instructions may comprise graphics processing algorithms that may be utilized by the graphics processor 210 to generate graphics frames. The stored data may comprise left and/or right decoded video content, 2D graphics content and/or left and/or right 3D graphics content, for example. The memory and playback module 216 may comprise RAM, ROM, low latency nonvolatile memory such as flash memory and/or other suitable electronic data storage.

The local storage 218 may comprise suitable logic, circuitry, interfaces and/or code that may be operable to record and store contents of 3D video applications and/or graphics programs and/or or data. The local storage 218 is an optional component for the VRU 130. The local storage 218 may comprise magneto- and/or optical drives such as a hard disk. The local storage 418 may also comprise solid state memory such as flash memory and/or other suitable electronic data storage capable of recording and storing data and instructions.

The VRU 130 may comprise suitable logic, circuitry, interfaces and/or code that may be operable to detect and/or reduce noise in the decoded 3D video stream left and/or right video frames and/or left and/or right 3D graphics frames. In this regard, corresponding left and/or right view 3D video and/or left and/or right view graphics frames may comprise redundant pixels structures that may be located in different locations within corresponding left and/or right view 3D video and/or graphics frames. For example, a parallax effect may cause an object located in one position of a left frame to be displaced to a different location in a corresponding right frame. The parallax effect may result from different points of view or different lines of sight from a left eye or left camera lens to the object and a right eye or right camera lens to the object. The VRU 130 may be operable to detect displacement of imagery and/or pixel structures due to parallax effects in corresponding left and/or right view 3D video and/or graphics frames.

The parallax estimation module 220 may comprise suitable logic, circuitry, interfaces and/or code that may be operable to determine displacement of imagery and/or pixel structures in left and right 3D video and/or graphics frames. In this regard, the parallax estimation module 220 may search a left view 3D video and/or graphics frame for redundant pixel structures that are identified in a corresponding right view 3D video and/or graphics frame and may generate parallax vectors for the redundant pixel structures in the left view. Similarly, parallax estimation module 220 may be operable to search the right view 3D video and/or graphics frame for redundant pixel structures that are identified in the corresponding left view 3D video and/or graphics frame and may generate parallax vectors for the redundant pixel structures in the right view. In various embodiments of the invention, the parallax vectors for the redundant pixel structures in the right view and the left view may be determined utilizing search information in only one direction, from left to right frames or from right to left frames. The parallax estimation module 220 may communicate the parallax vectors for the left view and/or for the right view 3D video and/or graphics frames to the parallax compensation module 222.

The parallax compensation module 222 may comprise suitable logic, circuitry, interfaces and/or code that may be operable to compensate for displacement of imagery and/or pixel structures, for example, due to parallax in left and right 3D video and/or graphics frames. For example, the parallax compensation module 222 may be operable to compensate for image displacement in the left view 3D video and/or graphics frame relative to the right view, based on the determined left view parallax vectors. Similarly, the parallax compensation module may be operable to compensate for the parallax displacement in the right view 3D video and/or graphics frame relative to the left view, based on the determined right view parallax vectors. The parallax compensation module 222 may communicate the compensated left and/or right view compensated 3D video and/or graphics frames to the parallax compensated noise reduction module 224.

The parallax compensated noise reduction module 224 may comprise suitable logic, circuitry and/or code that may be operable to blend the parallax compensated left view 3D video and/or graphics frame with the corresponding right view 3D video and/or graphics frame to generate a noise reduced right 3D video and/or graphics frame. Similarly, the parallax compensated noise reduction module 224 may be operable to blend the parallax compensated right view 3D video and/or graphics frame with the corresponding left view 3D video and/or graphics frame to generate a noise reduced left view 3D video frame and/or graphics.

In operation, the VRU 130 may receive a composite video stream and may parse or de-multiplex the left and/or the right 3D video streams and may communicate the left and/or right 3D video streams to the decoder 204. The decoder 204 may be operable to generate decoded left and/or right view 3D video frames and may communicate the frames to the memory and playback module 216 and/or the parallax estimation module 220. The parallax estimation module 220 may be operable to search the left and/or right 3D video frames for redundant pixel structures and may determine parallax vectors for the left and/or right 3D video frames. The parallax vectors and the left and/or right 3D video frames may be communicated to the parallax compensation module 222 which may compensate for parallax displacement in the right view 3D video based on the right view parallax vectors and may compensate for parallax displacement in the left view 3D video based on the left view parallax vectors.

In various embodiments of the invention, the searching may be performed in one direction, utilizing only one of the left or right frames as a reference to determine vectors for parallax compensation of both left and right frames. The parallax compensated left and right view 3D video frames and the decoded left and right view 3D video frames may be communicated to the parallax compensated noise reduction module 224. The parallax compensated noise reduction module 224 may blend the parallax compensated right view 3D video frame with the corresponding decoded left view 3D video frame to reduce noise in the left view 3D video frame. The parallax compensated noise reduction module 224 may blend the parallax compensated left view 3D video frame with the corresponding decoded right view 3D video frame to reduce noise in the right view 3D video frame. In this manner, noise reduction in left and/or right 3D video and/or left and/or right 3D graphics frames may be performed without introducing a delay, for example, a delay needed for receiving and/or processing previous and/or subsequent frames.

In various embodiments of the invention, corresponding left and right view 3D video and/or graphics frames may comprise content from a single time instant, for example, that may be captured and/or viewed concurrently. In other embodiments of the invention, the corresponding left and/or right view 3D video and/or graphics frames may be captured and/or viewed at different time instants, for example, 3D video displayed by 3D time sequential display devices. With regard to 3D time sequential display, the displacement of objects in corresponding left and/or right view 3D video and/or graphics frames may be caused by both parallax displacement as well as motion of objects in time between sequential left and right view frames.

Figure 3:
FIG. 3 is a block diagram that illustrates exemplary corresponding left view and/or right view 3D video and/or graphics frames, in accordance with an embodiment of the invention.

FIG. 3 is a block diagram that illustrates exemplary corresponding left view and/or right view 3D video and/or graphics frames, in accordance with an embodiment of the invention. Referring to FIG. 3, there is shown a left view 3D video and/or graphics frame 310 and a right view 3D video and/or graphics frame 312.

The left view 3D video and/or graphics frame 310 and/or the corresponding right view 3D video and/or graphics frame 312 may comprise decoded 3D video and/or graphics, output from the decoder 204 and/or graphics that may be generated by the graphics processor 208, for example. The left view 3D video and/or graphics frame 310 may comprise content as seen from a stereoscopic left point of view and the right view 3D video and/or graphics frame 312 may comprise graphics content as seen from a stereoscopic right point of view. In this regard, the left and right views may comprise ample redundant imagery that may comprise highly correlated pixel structures. The redundant imagery and/or correlated pixel structures may be located in different positions in the left view and right view 3D video and/or graphics frames 310 and 312. In this regard, the different positions may comprise a parallax shift of imagery and/or pixel structures caused by different points of left and right 3D camera lenses or by left view and right view 3D graphics perspectives, for example. However, noisy pixels in the left view 3D video and/or graphics frame 310 may not be correlated with noisy pixels in the right view 3D video and/or graphics frame 312. In this regard, the noisy pixels may comprise, for example, Gaussian noise, digital noise and/or mosquito noise.

In various exemplary embodiments of the invention, corresponding left and right view 3D video and/or graphics frames may comprise content from a single time instant, for example, that may be captured and/or displayed simultaneously. In other exemplary embodiments of the invention, the corresponding left and/or right view 3D video and/or graphics frames may be captured and/or displayed at different time instants. For example, left and right 3D video and/or 3D graphics frames may be displayed by a 3D time sequential display device. In this regard, the displacement of objects in corresponding left and/or right view 3D video and/or graphics frames may be caused by parallax displacement in left and right points of view as well as by motion of objects occurring over time between sequential left and right view frames.

Figure 4:
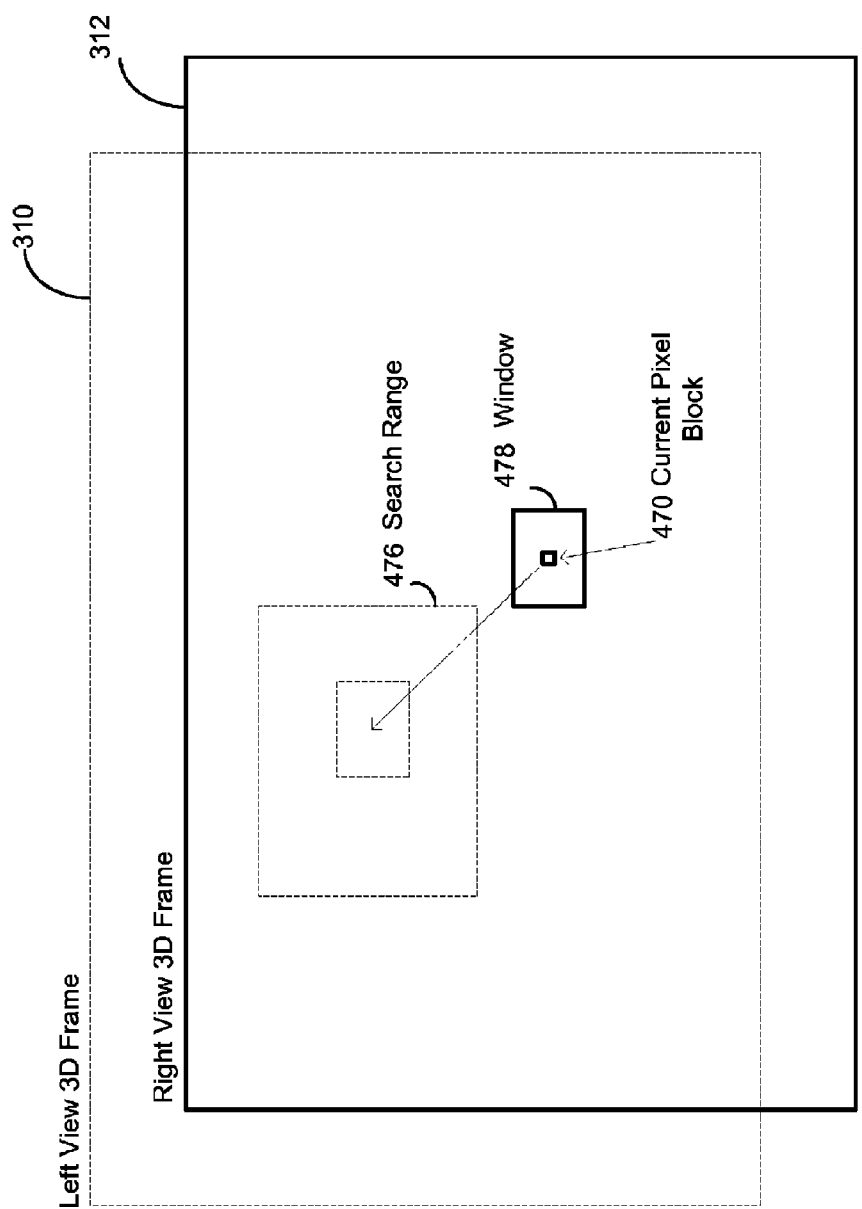
FIG. 4 is block diagram illustrating exemplary parallax estimation for left and right 3D video and/or graphics frames, in accordance with an embodiment of the invention.

FIG. 4 is block diagram illustrating exemplary parallax estimation for left and right 3D video and/or graphics frames, in accordance with an embodiment of the invention. Referring to FIG. 4, there is shown the left view 3D video and/or graphics frame 310, the right view 3D video and/or graphics frame 312, a current pixel block 470, a search range 476, and a window of pixels 478.

Aspects of the left view 3D video and/or graphics frame 310 and the right view 3D video and/or graphics frame 312 are described with respect to FIG. 3. The current pixel block 470 may comprise one or more pixels in the right view 3D video and/or graphics frame 312 for which parallax vectors may be determined. In this regard, the parallax estimation module 220 may search in the left view 3D video and/or graphics frame 310 for pixels that are correlated relative to the current pixel block 470 to determine the parallax vectors. For example, the window of pixels 478 in a neighborhood of the current pixel block 470 may be compared with a plurality of similarly dimensioned windows of pixels within the search range 476 located in the left view 3D video and/or graphics frame 310. A similar process may be utilized to determine parallax vectors for pixel blocks in the left view 3D video and/or graphics frame 310 relative to the right view 3D video and/or graphics frame 312.

In operation, the parallax compensated noise reduction module 224 may be operable to blend parallax compensated pixels from the left view 3D video and/or graphics frame 310 with corresponding pixels from the right view 3D video and/or graphics frame 312 to reduce noise in the right view 3D video and/or graphics frame 312. Similarly, the parallax compensated noise reduction module 224 may be operable to blend parallax compensated pixels from the right view 3D video and/or graphics frame 312 with corresponding pixels from the left view 3D video and/or graphics frame 310 to reduce noise in the left view 3D video and/or graphics frame 310.

Parallax compensated pixels and/or a parallax compensated left and/or right frames may be determined by the parallax compensation module 222 based on parallax vectors. The parallax vectors may represent displacement of image content at a specified location in a right view 3D video and/or graphics frame relative to a location of the image content in a corresponding left view 3D video and/or graphics frame and vice versa. The parallax vectors may be determined based on block matching, for example, by the parallax estimation block 220. In this regard, for each current pixel block 470 in the right view 3D video and/or graphics frame 312, a parallax vector may be determined. The parallax vectors may comprise one or more values that represent displacement in the horizontal and/or vertical directions of a redundant or a highly correlated pixel block that may be located within the search range 476 of the left view 3D video and/or graphics frame 310. For example, the window of pixels 478 within a neighborhood of the current pixel block 470 may be compared with a plurality of shifted windows of similar dimension within the search range 476 based. The comparison may be based on a sum of absolute differences or signed differences, for example. In various exemplary embodiments of the invention, the search range 476 may be bounded based on a range of displacement that may occur due to parallax. For example, the range of displacement due to parallax may be bounded based on a distance between left and right 3D camera lenses and/or the depth of an object in an image. However, the range of image displacement may also vary based on motion in instances that the left and right frames represent different instances in time.

Figure 5:
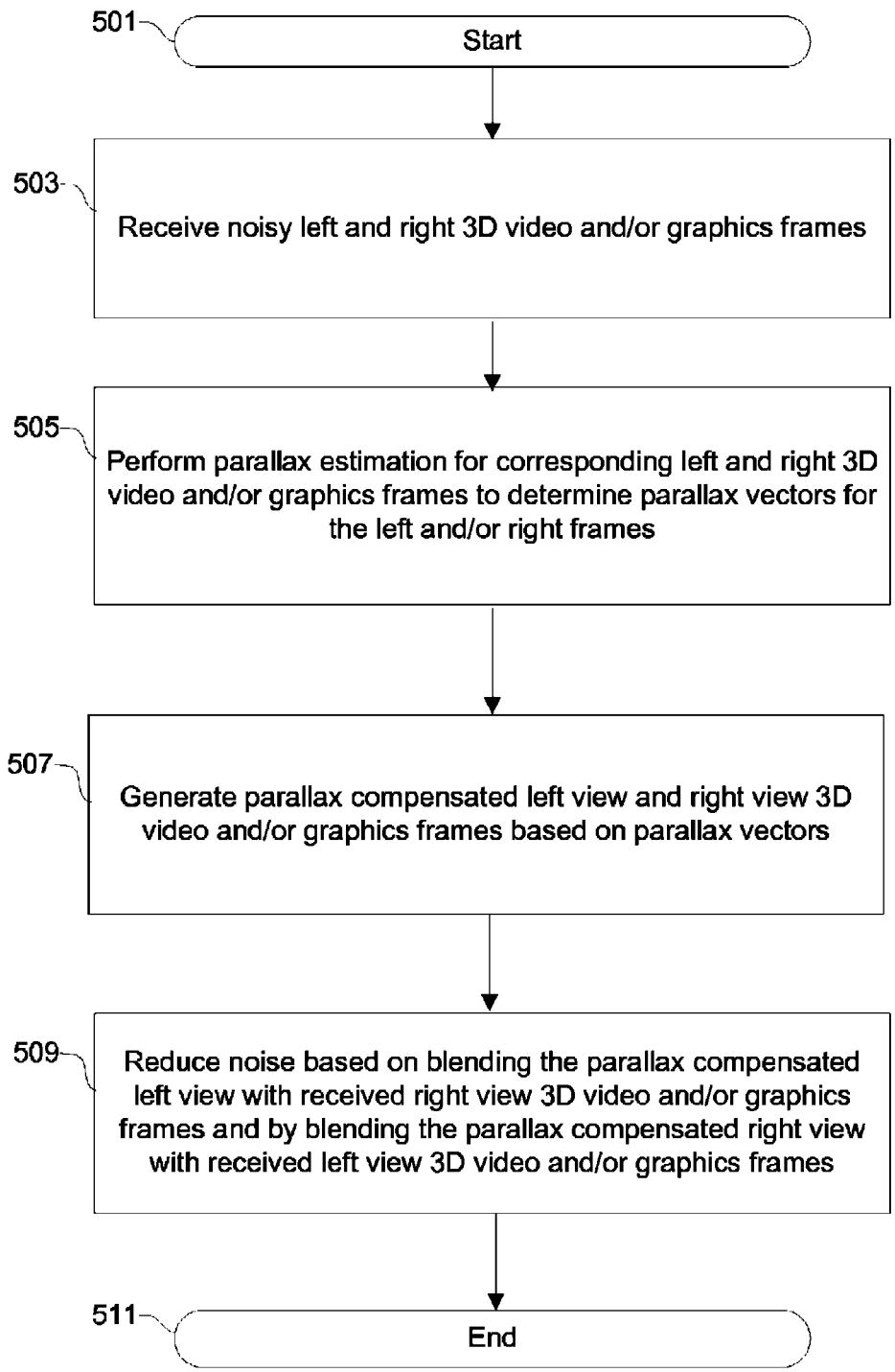
FIG. 5 is a flow chart illustrating exemplary steps for noise reduction in 3D content, in accordance with an embodiment of the invention.

FIG. 5 is a flow chart illustrating exemplary steps for noise reduction in 3D content, in accordance with an embodiment of the invention. The exemplary steps may begin with step 501. In step 503, the VRU 130 may receive noisy left and/or right 3D video and/or graphics frames. The graphics frames may comprise 3D graphics. In step 505, the parallax estimation module 220 may perform parallax estimation for corresponding left and right 3D video and/or graphics frames 310 and 312 to determine parallax vectors for the left and/or right frames. For example, the parallax estimation module 220 may search for redundant imagery and/or pixel structures in the left frame relative to the right frame and in the right frame, relative to the left frame to generate parallax vectors for both left and right frames, described with respect to FIG. 4, for example. In step 507, the parallax compensation module 222 may utilize the determined parallax vectors to generate parallax compensated left view and right view 3D video and/or graphics frames. In step 509, the parallax compensated noise reduction may reduce noise in 3D content by blending the parallax compensated left view 3D video and/or graphics frame with the received right 3D video and/or graphics frame and by blending the parallax compensated right view 3D video and/or graphics frame with the received left view 3D video and/or graphics frame. The exemplary steps may end with step 511.

In an embodiment of the invention, a video processing system may be operable to receive left and right 3D video and/or graphics frames 310 and 312, for example, and may generate noise reduced left 3D video, right 3D video and/or graphics frames utilizing parallax compensation of the left 3D video and the right 3D video and/or the graphics frames. In this regard, displacement may be determined of imagery and/or pixel structures relative to the left 3D video, the right 3D video and/or the graphics frames 310 and/or 312, for example, by the parallax estimation module 220. In this regard, redundant and/or correlated imagery and/or pixel structures in the left and/or the right 3D video and/or graphics frames 310 and 312 may be searched for within a bounded search area 476 of a corresponding opposite side of the left 3D video, the right 3D video and/or the graphics frame. In various embodiments of the invention, the search area 476 may be bounded based on a limitation of parallax displacement of the redundant and/or correlated imagery and/or pixel structure in the left 3D video and the right 3D video and/or the graphics frames 310 and 312, for example. Parallax vectors may be determined by the parallax estimation module, for example, based on image and/or pixel structure displacement in the left 3D video and/or the graphics frames 310 and the right 3D video and/or the graphics frames 312, for example. The parallax compensated left 3D video and the right 3D video and/or the graphics frames may be determined by the parallax compensation module 222 based on the parallax vectors. The left 3D video and/or the graphics frames 312, for example, may be blended with the parallax compensated right 3D video and/or the graphics frames. Similarly, the right 3D video and/or the graphics frame 312 may be blended with the parallax compensated left 3D video and/or the graphics frames. The left 3D video, the right 3D video and/or the graphics frames 310 and 312, for example, may comprise images that are captured, representative of and/or are displayed concurrently in time. In this manner, noise may be reduced in the left and/or right 3D video and/or the graphics frames without introducing delays caused by processing sequential frames.

Alternatively, the left 3D video, the right 3D video and/or the graphics frames, for example, 310 and 312 may comprise images that are captured, representative of and/or are displayed at different time instants. Accordingly, future and/or past, left and/or right 3D video and/or graphics frames may be utilized by the parallax estimation module 220 and/or the parallax compensation module 222 for parallax estimation and/or parallax compensation of current left and/or right 3D video and/or graphics frames, for example, 310 and/or 312. In this regard, motion estimation, bandlet and/or other suitable techniques may be utilized as well by the parallax estimation module 220. Furthermore, the parallax estimation module 220, the parallax compensation module 222 and/or the parallax compensated noise reduction module 224 may utilize motion-adaptive and/or motion-compensated noise reduction techniques as well as utilize parallax estimation and/or parallax compensation techniques on the left and/or right 3D video and/or graphics frames 310 and/or 312. Combining parallax compensation and motion compensation techniques may improve noise reduction. In instances when future and/or past frames are utilized for improving parallax estimation and/or compensation, for example, when motion estimation and/or compensation are utilized, complexity and time delay may increase.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for noise reduction for 3D video content.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
performing by one or more processors or circuits:
receiving left and right 3D media frames;
searching for redundant or correlated pixel structures within a bounded search area of the left or the right 3D media frames relative to a corresponding opposite side of the left or the right 3D media frame;
estimating displacement of pixel structures in the left and right 3D media frames relative to the corresponding opposite side of the left and right 3D media frames;

determining parallax vectors based on pixel structure displacement in the left 3D media frame and the right 3D media frame; and generating noise reduced left and right 3D media frames utilizing parallax compensation of the left and right 3D media frames by blending the left 3D media frame with the parallax compensated right 3D media frame to produce the noise reduced left 3D media frame and by blending the right 3D media frame with the parallax compensated left 3D media frame to produce the noise reduced right 3D media frame.

2. The method according to claim 1, wherein the search area is bounded based on a limitation of displacement due to parallax of the redundant or correlated pixel structures in the left and the right 3D media frames.

3. The method according to claim 1 comprising determining the parallax compensated left 3D media and the right 3D media frames based on the parallax vectors.

4. The method according to claim 1, wherein the left 3D media and the right 3D media frames comprise images that are captured or are displayed at the same instant.

5. The method according to claim 1, wherein the left 3D media and the right 3D media frames comprise images that are captured or are displayed at different instants in time.

6. The method according to claim 1, comprising performing one or more of motion estimation, motion compensation, motion adaption, bandlet or parallax compensation for generating the noise reduced left 3D or right 3D media frames.

7. The method according to claim 1, wherein the media frame comprises at least one of a video frame or a graphics frame.

8. The method according to claim 1, wherein the search area is bounded based on a distance between left and right 3D camera lenses.

9. A system for processing video, the system comprising:
one or more circuits that are operable to:
receive left and right 3D media frames;
search for redundant or correlated pixel structures within a bounded search area of the left or the right 3D media frames relative to a corresponding opposite side of the left or the right 3D media frame;
estimate displacement of pixel structures in the left and right 3D media frames relative to the corresponding opposite side of the left and right 3D media frames;
determine parallax vectors based on pixel structure displacement in the left 3D media frame and the right 3D media frame; and
generate noise reduced left and right 3D media frames utilizing parallax compensation of the left and right 3D media frames by blending the left 3D media frame with the parallax compensated right 3D media frame to produce the noise reduced left 3D media frame and by blending the right 3D media frame with the parallax compensated left 3D media frame to produce the noise reduced right 3D media frame.

10. The system according to claim 9, wherein the search area is bounded based on a limitation of displacement due to parallax of the redundant or correlated pixel structures in the left and the right 3D media frames.

11. The system according to claim 9, wherein the one or more circuits are operable to determine the parallax compensated left 3D media and the right 3D media frames based on the parallax vectors.

12. The system according to claim 9, wherein the left 3D media and the right 3D media frames comprise images that are captured or are displayed at the same instant.

13. The system according to claim 9, wherein the left 3D media and the right 3D media frames comprise images that are captured or are displayed at different instants in time.

14. The system according to claim 9, wherein the one or more circuits are operable to perform one or more of motion estimation, motion compensation, motion adaption, bandlet or parallax compensation for generating the noise reduced left 3D or right 3D media frames.

15. The system according to claim 9, wherein the search area is bounded based on a distance between left and right 3D camera lenses.

16. A system comprising:
a decoder configured to decode a 3D video stream into left 3D video frames and right 3D video frames;
a parallax estimation module configured to search for redundant or correlated pixel structures within a bounded search area of the left or the right 3D video frames relative to a corresponding opposite side of the left or the right 3D video frame;
the parallax compensation module configured to provide parallax compensation information to a parallax compensated nose reduction module;
the parallax estimation module further configured to determine parallax vectors based on pixel structure displacement in the left 3D video frame and the right 3D video frame; and
the parallax compensated noise reduction module configured to generate noise reduced left 3D video frames and right 3D video frames based at least in part on parallax compensation of the left 3D video frames and the right 3D video frames by blending the left 3D video frame with the parallax compensated right 3D video frame to produce the noise reduced left 3D video frame and by blending the right 3D video frame with the parallax compensated left 3D video frame to produce the noise reduced right 3D video frame.

17. The system according to claim 16, wherein the search area is bounded based on a limitation of displacement due to parallax of the redundant or correlated pixel structures in the left and the right 3D media frames.

18. The system according to claim 16, wherein the parallax compensation module is configured to estimate displacement of pixel structures in the left and right 3D media frames relative to the corresponding opposite side of the left and right 3D media frames.

19. The system according to claim 16, wherein the left 3D video and the right 3D video frames comprise images that are captured or are displayed at the same instant.

20. The system according to claim 16, wherein the left 3D video and the right 3D video frames comprise images that are captured or are displayed at different instants in time.

21. The system according to claim 16, wherein the parallax compensated noise reduction module is configured to perform one or more of motion estimation, motion compensation, motion adaption, bandlet or parallax compensation for generating the noise reduced left 3D or right 3D video frames.

22. The system according to claim 16, wherein the search area is bounded based on a distance between left and right 3D camera lenses.

* * * * *